United States Patent

Humes

[11] 3,734,538
[45] May 22, 1973

[54] STEERING ASSEMBLY FOR TRAILERS

[76] Inventor: Carl E. Humes, 907 Franklin Avenue, Steubenville, Ohio 43952

[22] Filed: Feb. 7, 1972

[21] Appl. No.: 223,877

Related U.S. Application Data

[60] Continuation-in-part of Ser. No. 135,243, April 19, 1971, Pat. No. 3,689,107

[52] U.S. Cl. .................................. 280/426, 280/442
[51] Int. Cl. ........................................... B62d 53/06
[58] Field of Search .......................... 280/426, 442

[56] References Cited

UNITED STATES PATENTS

| 3,195,922 | 7/1965  | Humes | 280/426 |
| 3,533,644 | 10/1970 | Humes | 280/426 |
| 3,689,107 | 9/1972  | Humes | 280/426 |
| 3,690,698 | 9/1972  | Humes | 280/426 |

Primary Examiner—Leo Friaglia
Attorney—Harold L. Stowell

[57] ABSTRACT

Steering mechanism for a tractor driven multiple wheeled trailer wherein the motive force for steering a plurality of wheeled axle assemblies of the trailer is derived from the fifth wheel of the tractor in the form of flexible draft members extending from the fifth wheel to the first of the wheeled axle assemblies and thereafter each wheeled axle assembly is positively interconnected to its preceding wheeled axle assembly either for pivotal motion in the same or the reverse direction and at pre-selected amounts.

3 Claims, 8 Drawing Figures

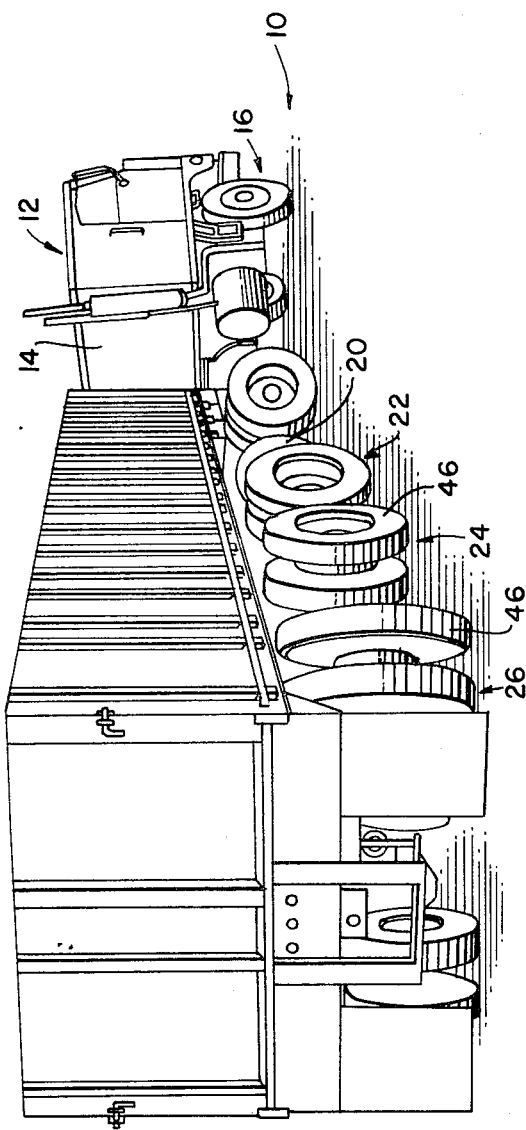
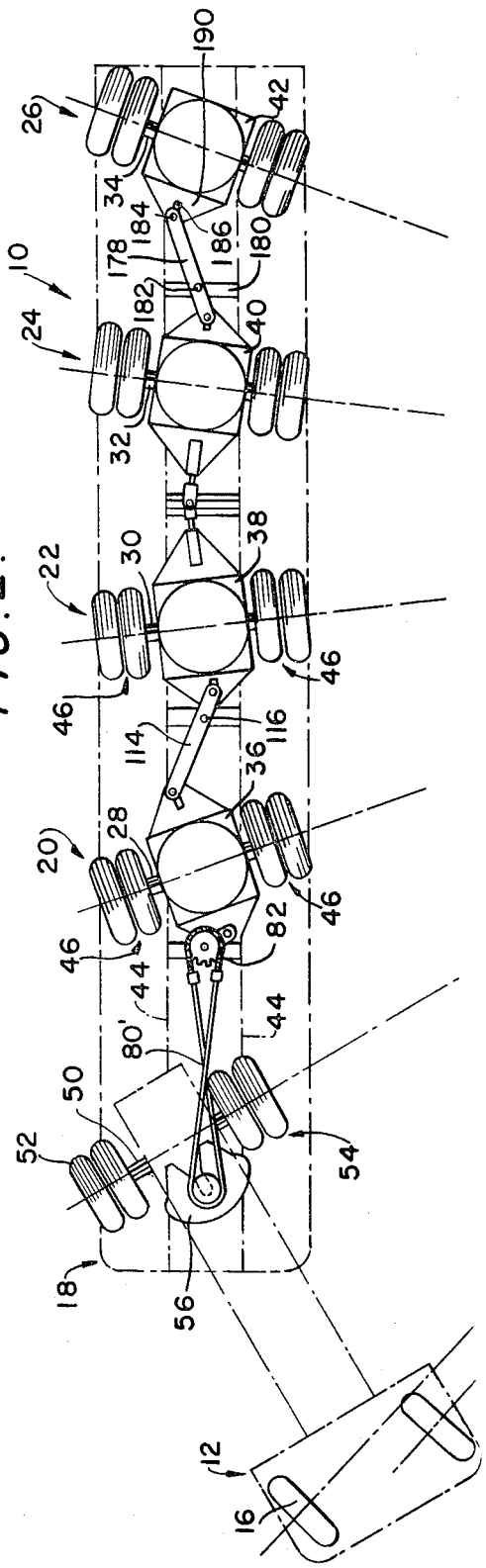
FIG. 1.
FIG. 2.

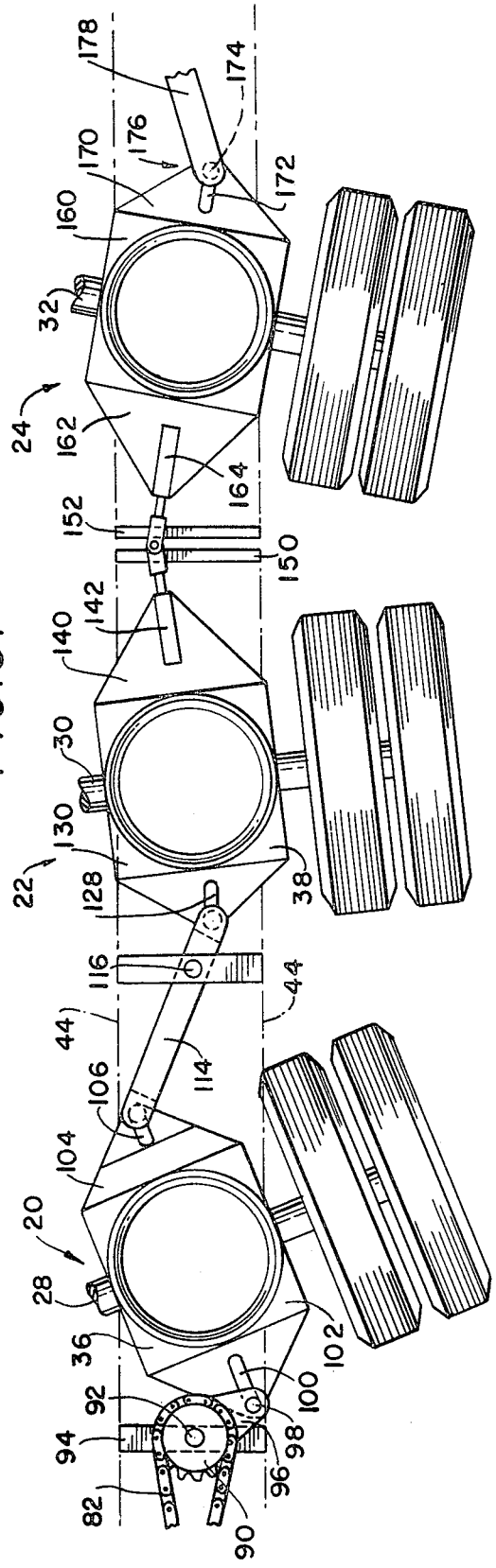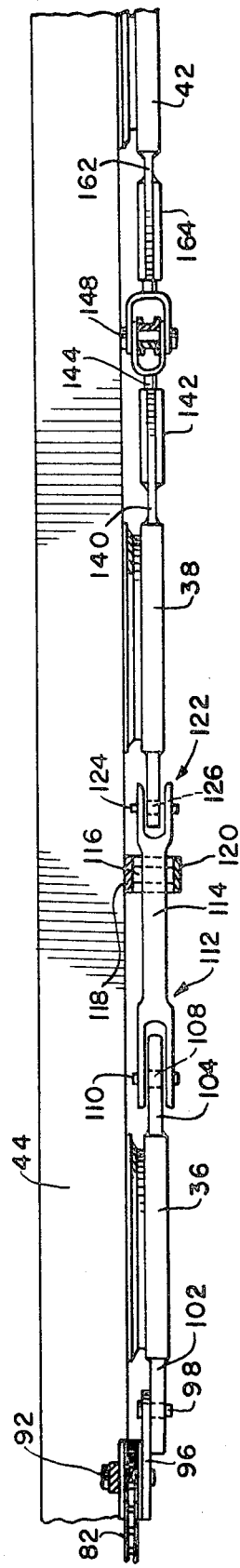

STEERING ASSEMBLY FOR TRAILERS

Related subject matter is disclosed and claimed in U.S. Pat. Nos. 3,181,914, 3,195,922 and 3,533,644, all in the name of Carl E. Humes, and this application is a continuation-in-part of my co-pending United States application Ser. No. 135,243, filed April 19, 1971 and now U.S. Pat. No. 3,689,107.

It is a primary object of the present invention to provide new and improved steering mechanisms for tractor driven multiple axle trailers whereby the steerable wheeled axle assemblies are positively steered by movements of the towing tractor and each wheeled axle assembly is positively controlled in its direction and amount of movement.

A further object is to provide such steering mechanism which, while suitable for all types of plural wheeled trailers, has particular utility in low frame type trailers and expandable trailer assemblies as the steering mechanism is maintained generally below the flanges of the trailer's main frame members and the means interconnecting the plural wheeled axle assemblies only extend between immediately adjacent wheeled axle assemblies.

These and other objects and advantages of the present invention will become apparent to those skilled in the art from the following detailed description of the invention considered in conjunction with the accompanying drawings wherein:

FIG. 1 is a prospective view looking generally forwardly along the right-hand side of a tractor trailer assembly equipped with the improved steering mechanism of the present invention;

FIG. 2 is a bottom plan view of the tractor trailer assembly shown in FIG. 1;

FIG. 3 is an enlarged fragmentary bottom plan view of the first, second and third wheeled axle assemblies of the vehicle illustrated in FIGS. 1 and 2;

FIG. 4 is a fragmentary enlarged partial vertical sectional view of the mechanism illustrated in FIG. 3;

Figure 5:
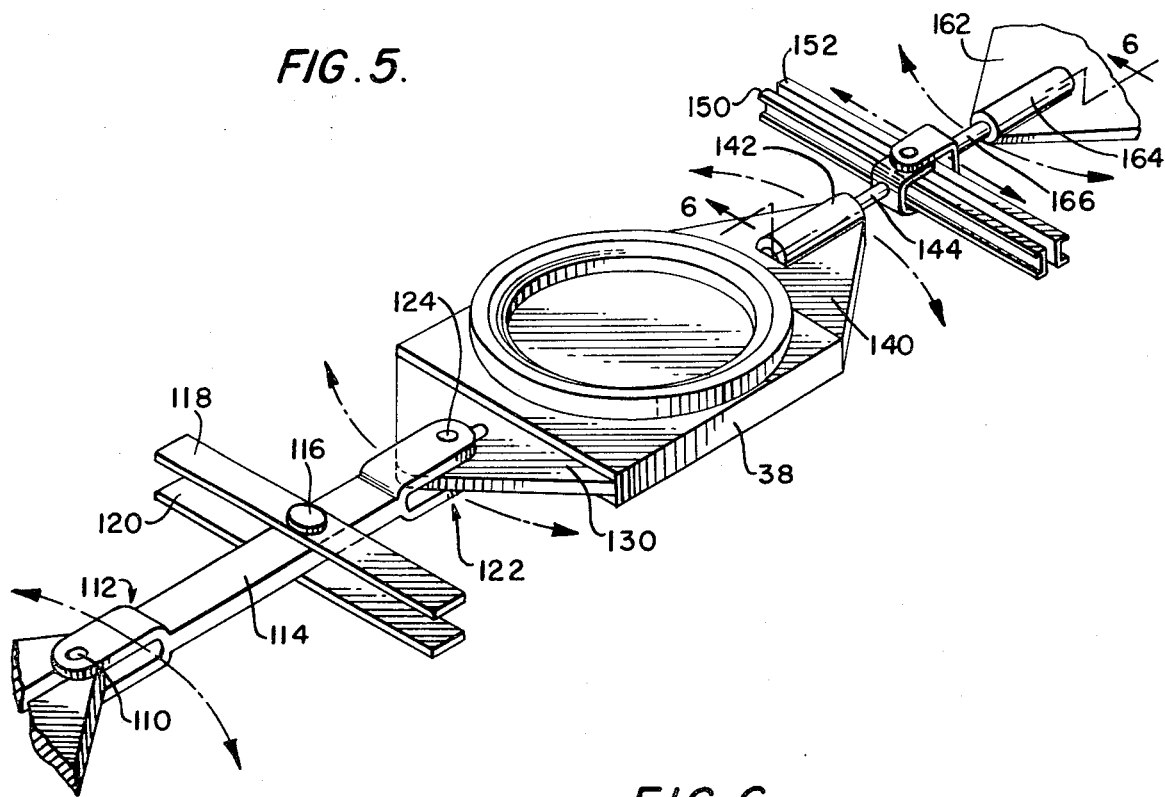
FIG. 5 is a further enlarged partially diagrammatic prospective view of a portion of the mechanism illustrated in FIG. 4.

Referring to the drawings, there is illustrated a tractor trailer assembly generally designated 10 composed of a towing tractor 12 having a cab 14 and driver steerable front wheels 16 and a trailer 18. The trailer 18, in the illustrated form of the present invention, includes first, second, third and fourth steerable axle assemblies generally designated 20, 22, 24 and 26. In the illustrated form of the invention each of the steerable axle assemblies comprises a single axle 28, 30, 32 and 34, respectively, which is secured to associated platforms 36, 38, 40 and 42. The platforms are rotatably connected to the main frame members 44 of the tractor in a manner described and claimed in, for example, my U.S. Pat. No. 3,533,644, granted Oct. 13, 1970. The outboard ends of each of the axles rotatably carry conventional wheels generally designated 46.

Figure 7:
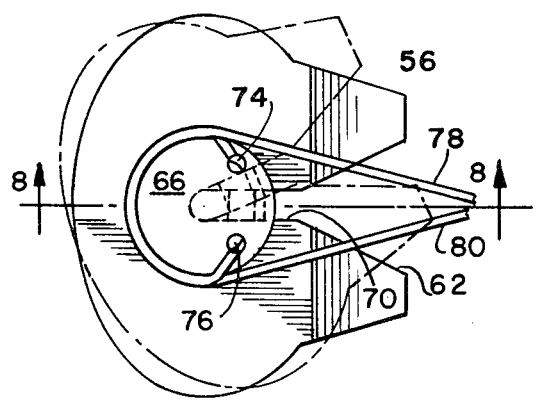
FIG. 7 is a fragmentary top plan view of the means interconnecting the fifth wheel of the tractor with the first wheeled axle assembly.
Figure 8:
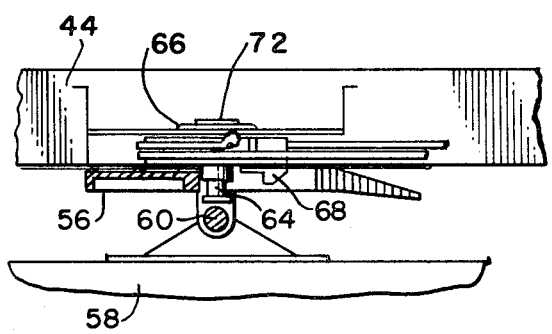
FIG. 8 is a section substantially on line 8-8 of FIG. 7.

The rearward end of the towing tractor 12 is provided with a drive axle assembly 50, drive wheels 52 and 54 and a conventional slotted fifth wheel 56. Referring particularly to FIGS. 7 and 8, the fifth wheel is secured to the main frame 58 of the towing tractor 12 for limited pivotal motion on a transverse pin 60 with the fifth wheel slot 62 directed generally rearwardly. The main frame members 44 of the trailer carry a kingpin 64, which kingpin is associated with a steering control plate 66 having secured thereto a depending crank arm 68. The crank arm 68 is received in the fifth wheel slot 62 and in its operative position, it lies in the non-tapered portion 70 of the slot whereby turning motion of the towing tractor and its attached fifth wheel causes the crank arm 68 to rotate on its pivot shaft 72 relative to the main frame members 44 of the trailer. These mechanisms are more specifically illustrated in my co-pending application Ser. No. 135,243, filed Apr. 19, 1971.

In order to utilize the motion imparted to the control plate 66 to rotate the first steerable axle assembly 20, the control plate 66 is shaped to receive balled ends 74 and 76 of a pair of flexible draft members 78 and 80, respectively, with each of said flexible draft members 78 and 80 making a partial turn about the steering control plate 66, thence extending rearwardly through a cross-over 80', FIG. 2, whereafter the opposite ends of the flexible draft members 78 and 80 are rigidly joined to a short section of chain 82.

Figure 6:
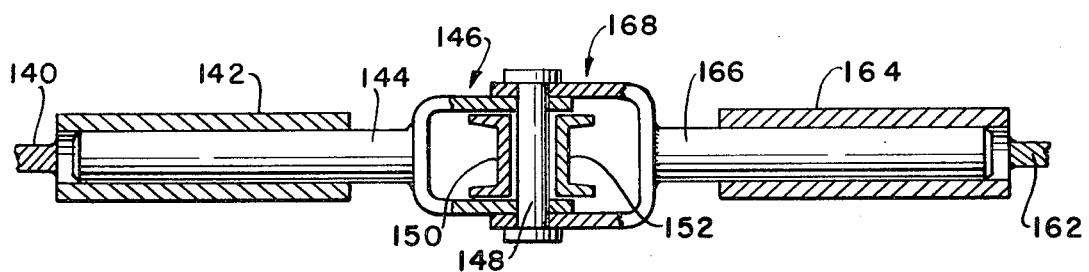
FIG. 6 is a section on line 6—6 of FIG. 5.

It will be appreciated that the flexible draft members 78 and 80 may be entirely composed of chains and the control plate 60 may include a toothed gear or pulley, such as shown in FIGS. 5 and 6 of my U.S. Pat. No. 3,533,644, without any particular change in the functioning of the improved steering mechanism.

Referring now to FIGS. 2, 3 and 4, it will be seen that the chain 82 is trained about a toothed wheel 90 journalled on a shaft 92, which shaft is secured between the trailer's main frame members 44 via cross frame 94. Secured to rotate with the toothed wheel 90 is a lever arm 96 which carries at its extended end a vertically aligned pivot pin 98 which is received in an elongated slot 100 in the forwardly extending skirt 102 formed rigidly with the frame 36 of the first wheeled axle assembly 20. With this assembly as the chain 82 is moved by movement of the control plate 66 in response to turning movement of the fifth wheel in response to steering of the trailer, the toothed gear or pulleys 90 correspondingly rotates urging the lever arm 96 and its vertically extending pin 98 to move in slot 100 and movement therein brings about corresponding turning movement of the frame 36 to which axle 28 is carried. It will be appreciated that the amount of movement of the plate 36 and its attached axle 28 is greatest at the beginning of a turn in either direction and decreases as the turn in either direction approaches 90 degrees, thus eliminating over control of the trailer.

Extending rearwardly from the plate 36 of the axle assembly 20 is a second skirt member 104 provided with an elongated slot 106 which corresponds to slot 100 in forwardly extending skirt 102. Received in the slot 106 is a roller 108 mounted for rotation on a pivot pin 110 secured between the bifurcated ends 112 of lever or crank arm 114.

The lever 114 is mounted for pivotal movement on a vertical axis via pivot pin 116 secured between upper and lower plate members 118 and 120, the extended ends of which are secured to the main frame members 44 of the trailer. The rearward end 122 of the lever arm 114 is also furcated and the arms thereof carry a pivot pin 124 mounting a further roller 126, which roller is received in a slot 128 in the forwardly extending skirt member 130 rigidly formed with platform 38 of the second wheeled axle assembly 22.

With this assembly platform 38 is caused to rotate in the opposite direction to the rotation of the platform 36 of the first wheeled axle assembly 20, and depending on the position of the pivot pin 116 relative to the pivotal axis of rollers 108 and 126, the degree of steering control of axle 30 relative to axle 38 is determined to provide for true tracking of the trailer. The platform 38 of the second wheeled axle assembly 22 also is provided with a rearwardly extending skirt member 140, which skirt member has mounted thereon a sleeve 142, as more clearly shown in FIGS. 5 and 6 of the drawings. Slidably mounted within the sleeve 142 is a shaft 144, the rearwardly extending end 146 of which is furcated and between the furcations is journalled a pivot pin 148, which pin is mounted between a pair of spaced raceways or track joining members 150 and 152, the extended ends of which are rigidly secured to the trailer main frame members 44.

The next succeeding wheeled axle assembly 24 also includes a platform 160 rotatably mounted to the trailer and to which the axle 32 is secured. The platform 160 includes a forwardly extending skirt member 162 which carries a tubular sleeve 164 corresponding to tubular sleeve 142 of the rearwardly extending skirt 140 of wheeled axle assembly 22. Slidably received in the tubular sleeve 164 is a shaft 166, the forward end of which is furcated as at 168 with the extended ends of the furcations carrying the pivot or slide pin 148. With this assembly the wheeled axle assembly 24 is caused to rotate in the opposite direction to the direction of rotation of the wheeled axle assembly 22, as more clearly shown in FIG. 3 of the drawings. In the illustrated form of the invention, the transverse track members 150 and 152 are equally spaced from the pivotal axis of the pair of wheeled axle assemblies 22 and 24, whereby when wheeled axle assembly 22 rotates in one direction an equal and reverse rotation is imparted to wheeled axle assembly 24. If reverse and unequal movement is desired in wheeled axle assembly 24, the position of the pair of track forming members 150 and 152 would be moved either closer or more distant from the pivotal axis of wheeled axle assembly 24. It will also be noted that as the pair of wheeled axle assemblies are caused to rotate from the straight line tracking position, the shafts 144 and 166 slide outwardly from their respective tubular sleeves 142 and 164. The platform 116 includes a rearwardly extending skirt member 170 which is slotted as at 172 to receive the pivot pin 174 carried at the forward bifurcated end 176 of lever arm 178, which lever arm corresponds to lever arm 114 interconnecting the first and second wheeled axle assemblies.

The lever arm 178 is pivotally connected to cross frames 180 via pivot pin 182 and the rearward end of the lever arm 178 is also bifurcated and receives between the furcations thereof a pivot pin 184, which pin is received in slot 186 formed in the forwardly extending skirt 190 carried by the platform 42 of the last in the series of wheeled axle assemblies 26. It will be noted that the relationship between the pivotal axis 182 and the pivotal axis 116 of lever arm 114 are in a reverse relationship such that wheeled axle assembly 26 is steered a greater amount than wheeled axle assembly 24.

These various relationships are more clearly shown in FIG. 2 wherein the relationship between the amount of steering and the direction of steering of each of the wheeled axle assemblies 20, 22, 24 and 26 are shown in relation to the turning of the driven tractor 12.

From the foregoing description of the preferred and alternate embodiments of the present invention, it will be seen that novel steering means are provided for trailers, which steering means permit varying the steering ratio between the tractor and the steerable wheels and an assembly which may be readily applied to trailers having two or more wheeled axle assemblies. It will also be appreciated that the various slide and pivot pins associated with this assembly may include the variable control means specifically shown and described in my co-pending application Ser. No. 135,243 without departing from the scope of the present invention.

I claim:

1. A multiple wheeled tractor-trailer assembly wherein the front end of the trailer is pivotally connected by a king pin to a fifth wheel supported by the tractor and the tractor fifth wheel is of the type which has a rearwardly opening king pin receiving slot, at least a pair of wheeled steerable axle assemblies supporting the trailer, means mounting the wheeled axle assemblies for controlled pivotal movement relative to the trailer main frame, a king pin carried at the forward end of the trailer and adapted to be received in the fifth wheel slot, a control plate mounted concentric to the king pin, a depending arm secured to the control plate eccentric to the king pin and adapted to be snugly received in the fifth wheel slot rearwardly of the king pin, a vertical shaft mounted to the trailer forward of the first of the pair of wheeled axle assemblies, a second control plate secured to the upper portion of the vertical shaft, a control arm secured to the lower end portion of the shaft for rotation therewith, a slide arrangement connecting the control arm to the first of the pair of wheeled axle assemblies, flexible draft members connecting the control plate and the second control plate to cause pivotal movement of the first of the pair of wheeled axle assemblies, a lever arm, means pivotally mounting the lever arm to the trailer intermediate its ends for movement about a vertical axis, slide means connecting the forward end of the lever arm to the rearward end of the first of the pair of wheeled axle assemblies and further slide means connecting the rearward end of the lever arm to the second of the pair of wheeled axle assemblies.

2. The assembly defined in claim 1 further including a transverse guideway secured to the trailer, slide means connecting the rearward end of the second of the pair of wheeled axle assemblies to a member mounted for transverse movement in said transverse guideway, and slide means connecting the forward end of a further wheeled axle assembly to said member mounted for transverse movement in said transverse guideway.

3. The assembly defined in claim 2 further including a second lever arm, means pivotally mounting to the trailer the second lever arm intermediate its ends for movement about a vertical axis, slide means connecting the forward end of the second lever arm to the rearward end of the further wheeled axle assembly and further slide means connecting the rearward end of the second lever arm to the forward end of another wheeled axle assembly.

* * * * *